March 10, 1936.  H. L. WALKER  2,033,212

SCALE

Filed May 27, 1932

INVENTOR.
HAROLD L. WALKER,
BY Duell, Dunn & Anderson
ATTORNEYS.

Patented Mar. 10, 1936

2,033,212

UNITED STATES PATENT OFFICE 2,033,212

SCALE

Harold L. Walker, Brooklyn, N. Y., assignor to The Jacobs Bros. Co. Inc., Brooklyn, N. Y., a corporation of New York Application May 27, 1932, Serial No. 613,889

3 Claims. (Cl. 265—49)

This invention relates to a structurally and functionally improved scale.

An object is that of constructing a scale with which an auxiliary weight may be associated in any improved manner.

Among other objects of the invention are the furnishing of an apparatus of this character which will embody relatively few and rugged parts, each individually simple in construction and capable of quick assemblage and set-up to provide a scale capable of being sold at nominal cost and operating over long periods of time with freedom from difficulty.

With these and other objects in mind, reference is had to the attached sheet of drawing illustrating embodiments of the invention and in which.

Figure 1:
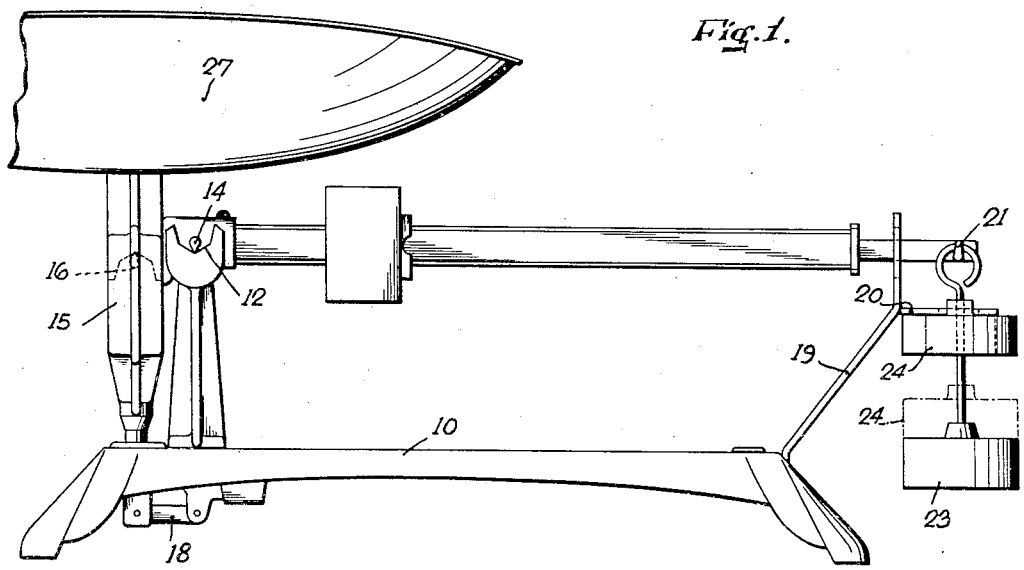
Fig. 1 shows a scale with an auxiliary weight associated with the beam end.
Figure 2:
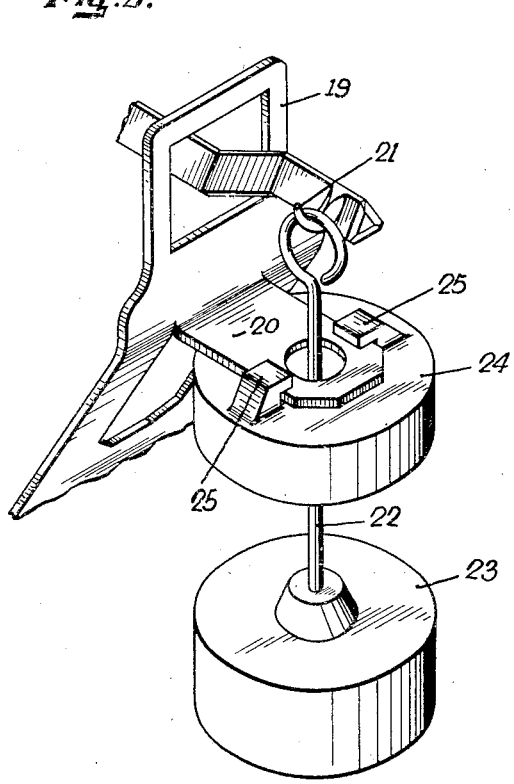
Fig. 2 is a perspective view of these parts.
Figure 3:
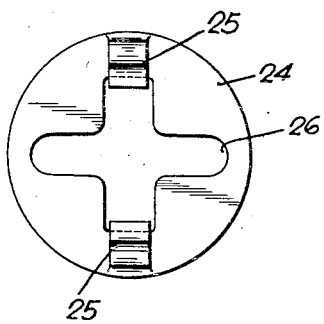
Fig. 3 is a plan view of this weight.

In these several views the numeral 10 indicates a scale base from which a standard or bracket portion 11 extends upwardly. At the ends of this bracket there are provided, in the usual manner, bearings 12 of any desired type and material. These bearings rockingly support a beam 13 by means of pivots 14. As shown, a pan support 15 is rockingly mounted on bearing members 16 at the end of the short beam arm, this support being extended through the scale base, and its lower end pivotally secured to one end of a link 18, the opposite end of which is similarly connected to the base and in line with the bearing portions 12—14.

The opposite arm of the beam is extended through a guide-guard plate 19, and as shown, this plate may have an outwardly extending shelf or support portion 20. Adjacent this end of the beam a supporting hook 21 is provided and this hook mounts, by means of a rod 22, a counter-weight 23. The rod 22 extends through an opening in the support 20 and the latter normally mounts a weight 24, from which flange portions 25 extend, the latter overlapping and slidably embracing the edges of the support 20. As illustrated, the body of the weight 24 is slotted as at 26 in order to provide amply for the passage of the rod 22 and permit the weight to be slid outwardly and beyond the support without displacing the rod. Consequently, the weight 24 may normally occupy the position shown, but if it is desired to increase the capacity of the scale, this result may be achieved readily by simply sliding the weight outwardly, as aforedescribed, and permitting it to rest upon the weight 23, as indicated in dotted lines in Fig. 1.

Thus, among others, the several objects of the invention as specifically aforenoted, are achieved. Obviously, numerous changes and rearrangements of the parts might be resorted to without departing from the spirit of the invention as defined by the claims.

Having described my invention, what I claim as new and desire to secure by Letters Patent is:

1. A scale including, in combination, a rockingly mounted beam, a support extending adjacent thereto, a rod extending through an opening in said support and coupled to said beam, a balance weight carried by said rod and an auxiliary balance weight connectible with said support and transferable to said first named balance weight, said auxiliary balance weight being formed with a slot for the passage of said rod.

2. A scale including, in combination, a rockingly mounted beam, a support extending adjacent thereto, a rod extending in proximity to said support and coupled to said beam, a balance weight carried by said rod and an auxiliary balance weight connectible with said support and transferable to said first named balance weight, said auxiliary balance weight being formed with a slot for the passage of said rod and extensions forming a part of said latter weight and slidably engageable with said support.

3. A scale including, in combination, a rockingly mounted beam, a support extending adjacent thereto, a rod extending through an opening in said support and coupled to said beam, and an auxiliary balance weight connectible with said support and transferable to said rod, said balance weight being formed with a slot for the passage of said rod.

HAROLD L. WALKER.